United States Patent
Danna et al.

(10) Patent No.: US 8,739,115 B2
(45) Date of Patent: *May 27, 2014

(54) USING INFEASIBLE NODES TO SELECT BRANCHING VARIABLES

(75) Inventors: Emilie Jeanne Anne Danna, Mountain View, CA (US); Andrea Lodi, Bologna (IT)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/421,675

(22) Filed: Mar. 15, 2012

(65) Prior Publication Data

US 2012/0173586 A1    Jul. 5, 2012

Related U.S. Application Data

(63) Continuation of application No. 12/580,329, filed on Oct. 16, 2009.

(51) Int. Cl.
*G06F 9/44* (2006.01)
*G06F 7/00* (2006.01)

(52) U.S. Cl.
USPC .......................................... 717/104; 707/707

(58) Field of Classification Search
None
See application file for complete search history.

(56) References Cited

U.S. PATENT DOCUMENTS

| | | | |
|---|---|---|---|
| 5,177,684 A * | 1/1993 | Harker et al. ................. | 701/117 |
| 2001/0013027 A1* | 8/2001 | Akkiraju et al. ................ | 706/21 |
| 2009/0182814 A1* | 7/2009 | Tapolcai et al. ............... | 709/205 |
| 2010/0121671 A1 | 5/2010 | Boutilier et al. .................. | 705/8 |
| 2011/0130855 A1 | 6/2011 | Philpott et al. .................. | 700/99 |
| 2012/0173576 A1 | 7/2012 | Gillam et al. ................. | 707/780 |

OTHER PUBLICATIONS

Tobias Achterberg, "Constraint Integer Programming," Phd thesis, Technische Universitaet Berlin, Jul. 2007, http://opus.kobv.de/tuberlin/volltexte/2007/1611/, 418 pages.

J. T. Linderoth and M. W. P. Savelsbergh, "A Computational Study of Branch and Bound Search Strategies for Mixed Integer Programming," INFORMS Journal on Computing, vol. 11, No. 2, pp. 173-187, Spring 1999.

Gustafsson et al., "Algorithms for Infeasible Path Calculation," Malardalen University, Workshop on Worst-Case Execution Time (WCET) Analysis 2006 (WCET 06), Dresden, Germany, Jul. 2006, 6 pages.

* cited by examiner

*Primary Examiner* — Hyun Nam
(74) *Attorney, Agent, or Firm* — VanLeeuwen & VanLeeuwen; John D. Flynn

(57) ABSTRACT

An optimization engine identifies an infeasible node in a tree data structure that corresponds to a programming model, and computes a fake objective value for the infeasible node. The optimization engine then updates a branching variable pseudocost using the fake objective value. Next, the optimization engine uses multiple branching variable pseudocosts corresponding to multiple branching variable candidates in order to select one of the branching variable candidates. In turn, the optimization engine branches to the corresponding branch of the selected branching variable.

7 Claims, 8 Drawing Sheets

USING INFEASIBLE NODES TO SELECT BRANCHING VARIABLES

RELATED APPLICATION

This application is a continuation of U.S. application Ser. No. 12/580,329, filed Oct. 16, 2009, titled "Using Infeasible Nodes to Select Branching Variables," and having the same inventors as the above-referenced application.

TECHNICAL FIELD

The present invention relates to using infeasible nodes to select branching variables. More particularly, the present invention relates to computing fake objective values for infeasible nodes and utilizing the fake objective values to generate pseudocosts that, in turn, are used for selecting a branching variable from multiple branching variable candidates.

BACKGROUND

Optimization technology provides organizations with an ability to generate effective plans and schedules. For example, a manufacturing organization may wish to have optimization technology generate a production plan for producing a product at the least cost, or generate a production plan for producing the largest number of goods in a shortest amount of time. When "components" change, such as employee availability, machine availability, etcetera, an organization may use optimization technology to create alternative plans and schedules.

Optimization technology typically utilizes an "optimization model" and an "optimization engine" to solve for an organization's "outcome objective." The optimization model captures complex planning or scheduling problems through equations, and the optimization engine applies the optimization model to various scenarios in order to identify possible solutions based upon the outcome objective, such as minimizing cost, shortening schedule, and/or optimizing a manufacturing plant's productivity. The optimization engine may generate a tree data structure (includes nodes and branches) that correspond to the programming model. At particular nodes during the optimization process, the optimization engine may select a branching variable from multiple branching variable candidates and, as a result, proceed to branch on the selected branching variable and solve for the branching variable's child nodes.

SUMMARY

An optimization engine identifies an infeasible node in a tree data structure that corresponds to a programming model, and computes a fake objective value for the infeasible node. The optimization engine then updates a branching variable pseudocost using the fake objective value. Next, the optimization engine uses multiple branching variable pseudocosts corresponding to multiple branching variable candidates in order to select one of the branching variable candidates. In turn, the optimization engine branches to the corresponding branch of the selected branching variable.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
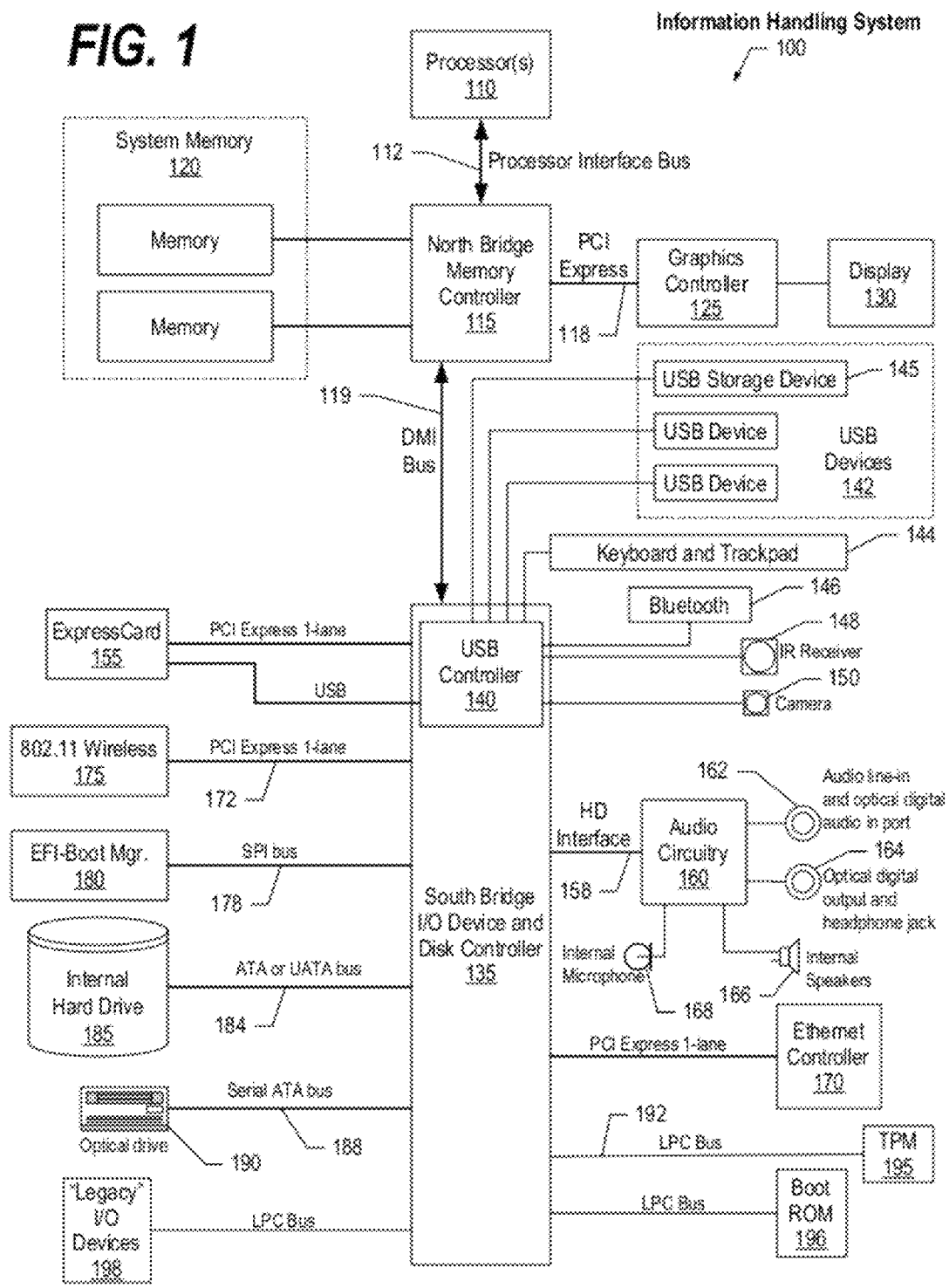
FIG. 1 is a block diagram example of a data processing system in which the methods described herein can be implemented.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
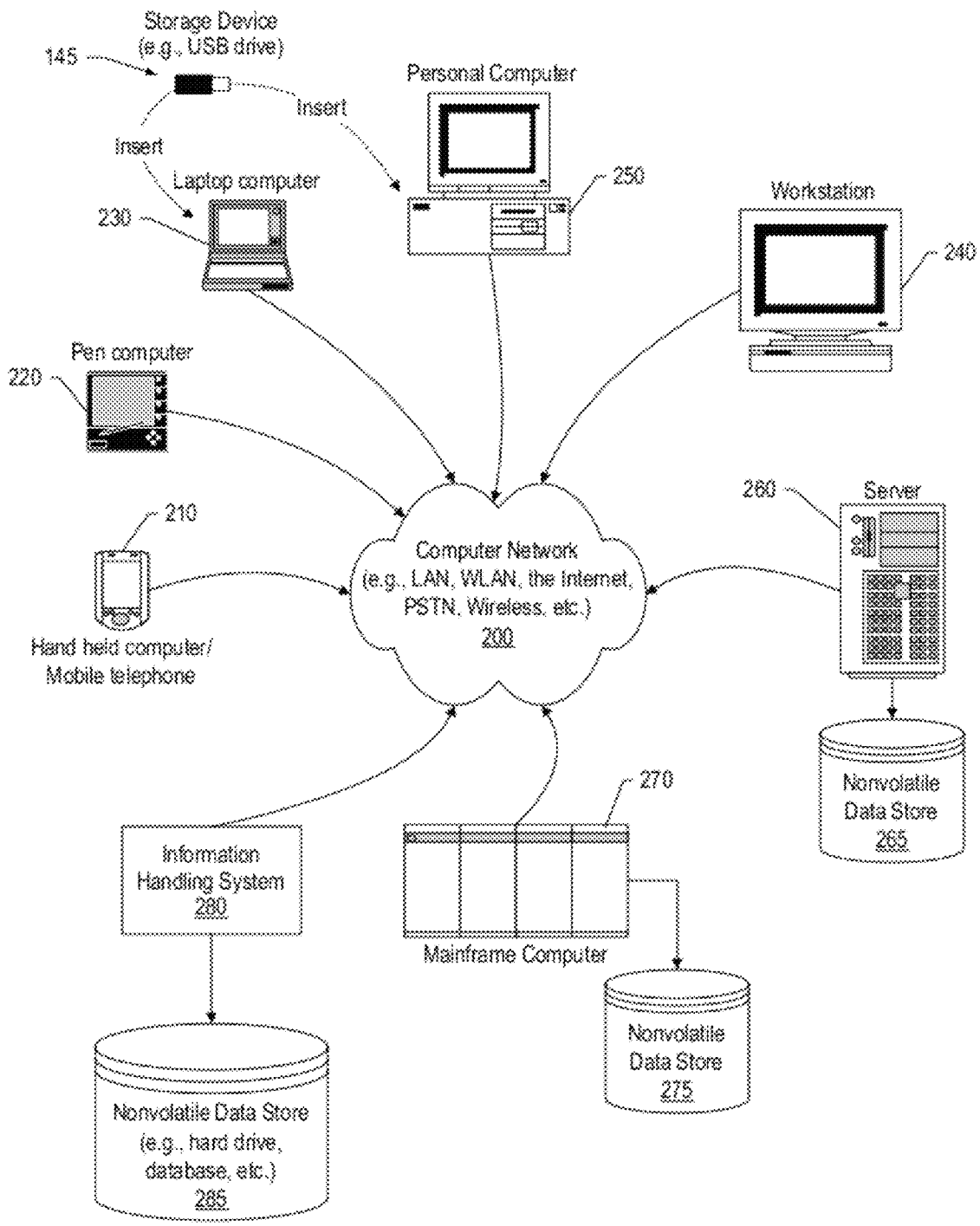
FIG. 2 provides an extension example of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA)

controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
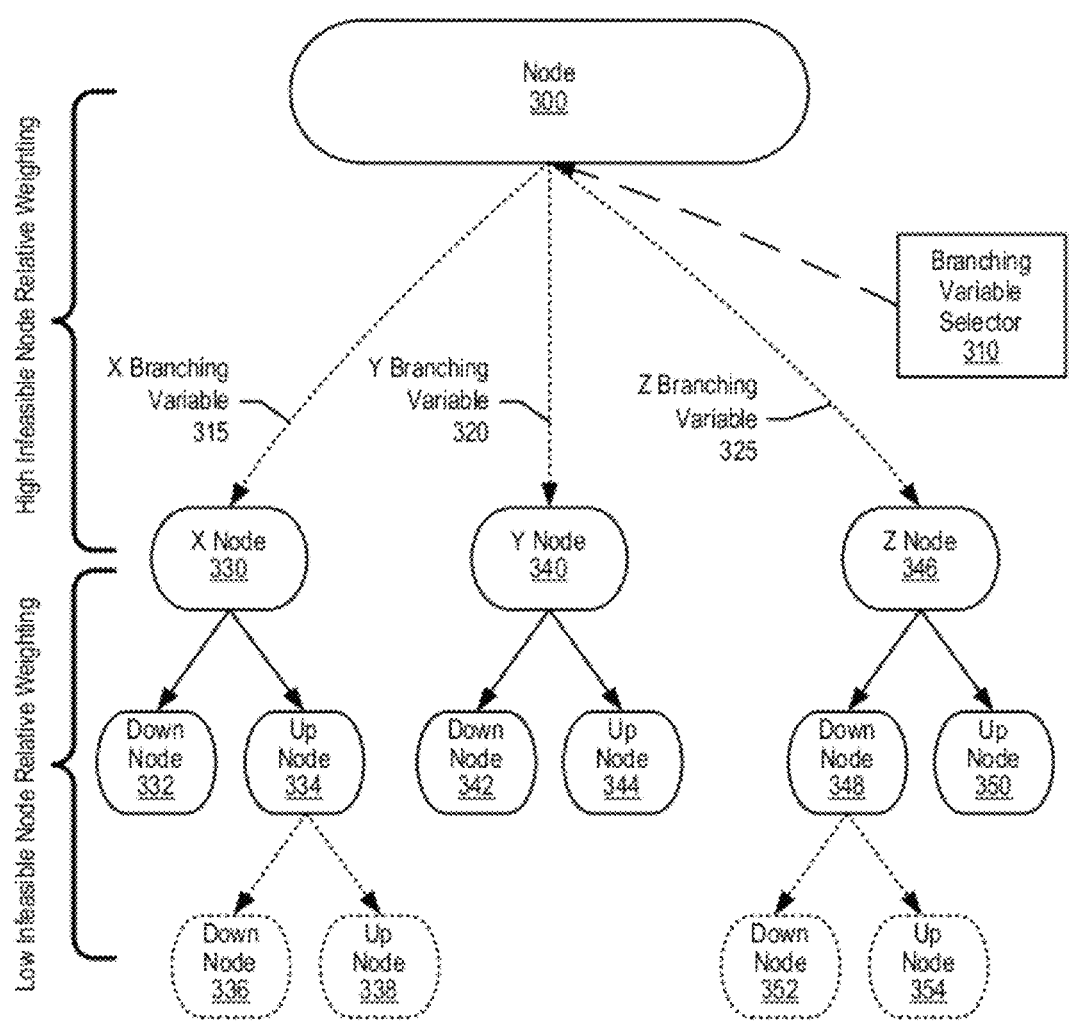
FIG. 3 is a diagram example of a tree data structure where a mixed integer programming solver places a high relative weighting on infeasible nodes at the beginning of a branching variable selection process.

FIG. 3 is a diagram example of a tree data structure where a mixed integer programming solver places a high relative weighting on infeasible nodes at the beginning of a branching variable selection process. A mixed integer programming (MIP) solver is an optimization engine that searches for potential solutions of a MIP model corresponding to an outcome objective, such as finding a lowest cost production throughput or the quickest production throughput. The MIP model defines and structures a problem by including a set of equations that define components of the problem, such as available resources, demand fulfillment, services to be performed, and operating and capital costs. In turn, the MIP solver produces solutions of the MIP model that correspond to an outcome objective or business problem, such as a general six month production plan, a one month workforce schedule, or a truck loading plan.

During the optimization process, the MIP solver encounters nodes that include multiple "branching variable candidates," which are discrete variables within the MIP model that are fractional at the particular node. The example in FIG. 3 shows that node 300 includes three branching variable candidates, which are variables "X," "Y," and "Z." In one embodiment, the MIP solver decides (branching variable selector 310) which branch to select (X branching variable 315, Y branching variable 320, or Z branching variable 325) based upon previous branching history using pseudocosts. Pseudocosts are estimate costs based upon previously branching from a parent node to a child node, which are computed as the difference in parent-child objective value divided by the difference in the parent-child change in branching variable value. For example, if a parent node's objective value is 100 when X=0.6, and a child node's objective value is 80 when X=0, then the pseudocost is (100−80)/(0.6−0)=20/0.6=33.3 (see FIG. 5 and corresponding text for further details). Once the MIP solver selects a branch, the MIP solver solves for subsequent child nodes, such as nodes 330-338, nodes 340-344, or nodes 346-354.

When the MIP solver identifies an infeasible node, the MIP solver computes a fake objective value for the infeasible node and, in turn, computes a pseudocost using the fake objective value. The MIP solver places a high relative weighting on infeasible nodes (fake objective values) compared with feasible node weightings (real objective values) at the beginning stages of branching decisions when branching decisions are most important. As the MIP solver proceeds down one of the branches, the MIP solver reduces the relative weighting of the infeasible nodes in order to avoid propagating infeasible node importance down a tree branch. In one embodiment, the MIP solver starts with a high relative weighting of the infeasible nodes, then decreases the relative weighting of the infeasible nodes after the MIP solver identifies a first integer feasible solution. In another embodiment, the MIP solver increases again the relative weighting of the infeasible nodes once an optimal solution is found until the MIP proves the optimality (see FIG. 4 and corresponding text for further details). In yet another embodiment, the MIP solver may compute fake objective values when a MIP programming model does not include a corresponding objective function. In this embodiment, the MIP solver is able to intelligently select a branching variable candidate based upon pseudocosts generated from the fake objective values.

As those skilled in the art can appreciate, utilizing infeasible node information for branching decisions may also be used in other scenarios, such as branching on a variable with more than two children nodes, branching on a special ordered set (SOS), or branching on a hyperplane.

Figure 4:
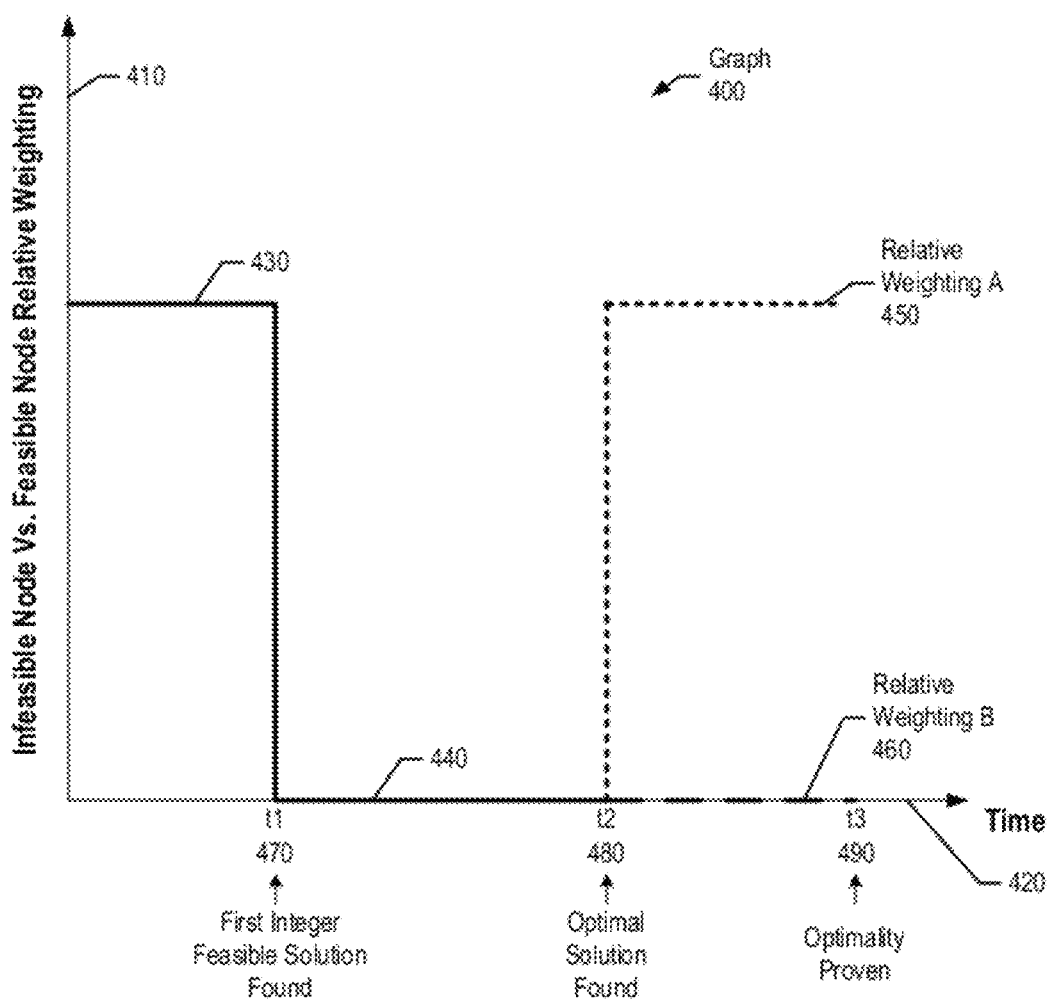
FIG. 4 is a graphical example showing relative weighting between an infeasible node and a feasible node throughout a MIP solver's optimization process.

FIG. 4 is a graphical example showing relative weighting between an infeasible node and a feasible node throughout a MIP solver's optimization process. Graph 400 shows three points in time along time axis 420, which are at t1 470, t2 480, and t3 490. T1 470 corresponds to a time at which the MIP solver identifies a first integer feasible solution (see FIG. 8 and corresponding text for further details). T2 480 corresponds to a time at which the MIP solver identifies an optimal solution, which may be estimated in a variety of ways. T3 490 corresponds to a time at which the MIP solver proves optimality for a MIP programming model.

Axis 410 represents the relative importance between an infeasible node and a feasible node during the optimization process. More precisely, axis 410 represents the relative weighting between an infeasible node's computed fake objective value and a feasible node's real objective value. Line 430 shows that the infeasible node weighting is higher than the feasible node weighting up until the MIP solver identifies a first integer feasible solution at time t1 470. At this point, the feasible node weighting becomes higher than the infeasible node weighting (line 440) until the MIP solver identifies an optimal solution at t2 480. In one embodiment, the MIP solver continues to keep the infeasible node weighting lower than the feasible node weighting (line 460) until the MIP solver proves optimality at t3 490. In another embodiment, the MIP solver may increase the infeasible node weighting higher than the feasible node weighting (line 450) until the MIP solver proves optimality. The example shown in FIG. 4 shows one embodiment of varying the relative importance of infeasible node weighting versus feasible node weighting, and as those skilled in the art can appreciate, other embodiments may be utilized to vary the relative importance of infeasible node weighting versus feasible node weighting over time.

Figure 5:
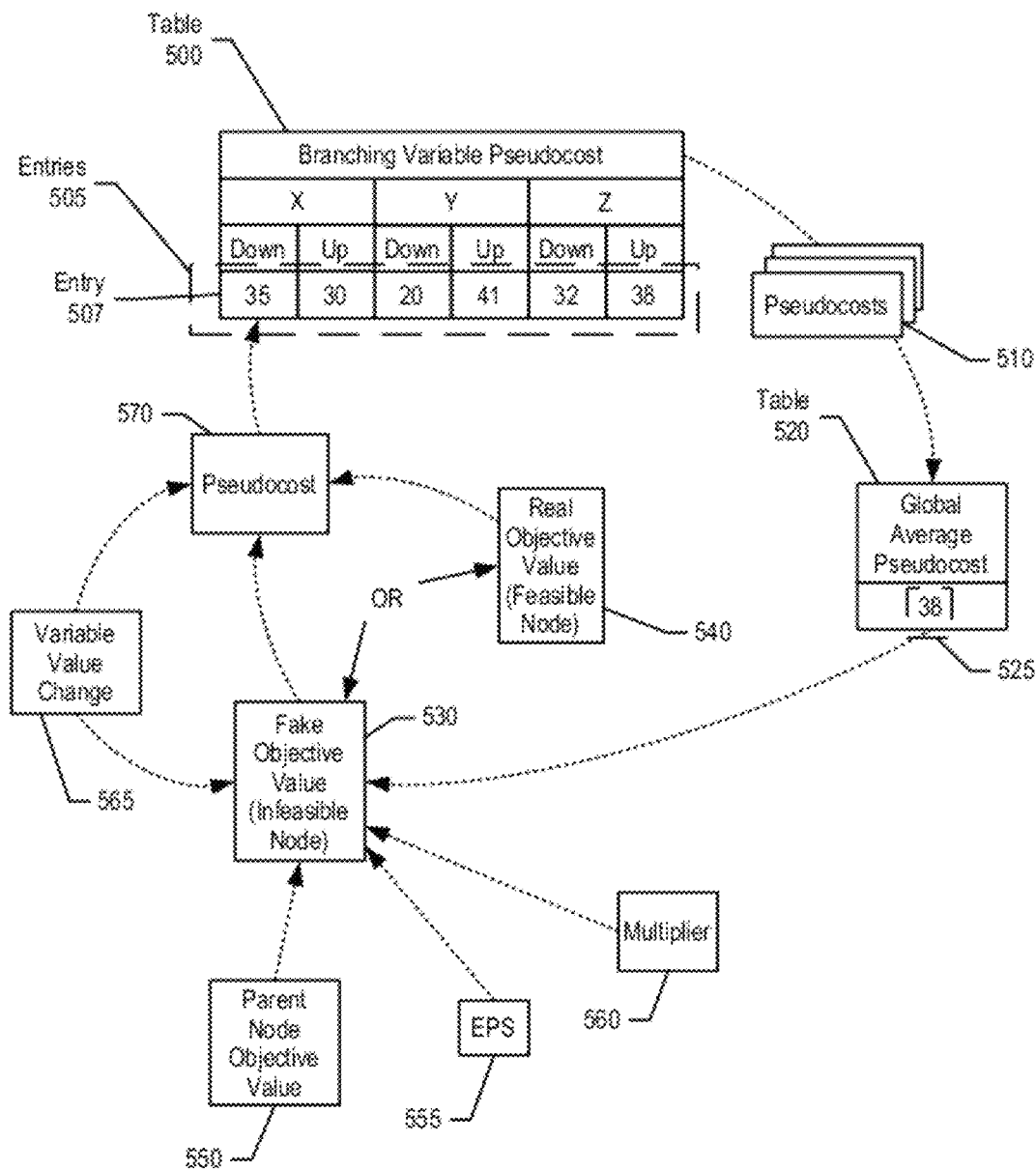
FIG. 5 is a diagram example showing computational relationships between real and fake objective values, pseudocosts, and a global average pseudocost.

FIG. 5 is a diagram example showing computational relationships between real and fake objective values, pseudocosts, and a global average pseudocost. Table 500 includes a list of branching variable candidates and their corresponding pseudocost entries 505. Each branching variable candidate has a corresponding upward pseudocost from increasing a variable value (e.g., increasing X from 0.6 to 1.0) and a corresponding downward pseudocost from decreasing a variable value (e.g., decreasing X from 0.6 to 0.0).

The example in FIG. 5 shows pseudocost 570 entered into branching variable candidate X's downward pseudocost entry 507. A MIP solver creates pseudocost 570 from either real objective value 540 or fake objective value 530. When the MIP solver solves a feasible node, the MIP solver uses variable value change 565 and real objective value 540 to generate pseudocost 570. Variable value change 565 is the variable change in value between the parent node and child node (e.g., X=0.6 to X=0). In one embodiment, the MIP solver uses the following formula to generate a pseudocost for a node:

$$\text{Pseudocost} = \frac{\text{Difference in objective value}}{\text{Difference in variable value}}$$

For example, if a parent node's objective value is 100 when X=0.6, and a downward child node's (X=0) objective value is 80, then the branching variable candidate's downward pseudocost is:

Pseudocost=(100−80)/(0.6−0)=20/0.6=33.3

As such, when a MIP solver solves real objective value 540, the MIP solver uses real objective value 540 in the above formula to compute pseudocost 570 and enter pseudocost 570 into one of the respective entries 505.

However, when the MIP solver identifies an infeasible node that does not result in a real objective value, the MIP solver generates fake objective value 530 using parent node objective value 550, epsilon (EPS) 555, multiplier 560, and global average pseudocost 525 included in table 520. In one embodiment, the MIP solver updates global average pseudocost 525 at particular times using all of branching variable pseudocost entries 505 included in table 500 (pseudocosts 510) (see FIG. 8 and corresponding text for further details). In one embodiment, the MIP solver uses the following formula to compute fake objective value 430:

Fake Objective Value=(gap*valchg+eps)*mult+pnov

In the above formula, gap is global average pseudocost 525; valchg is variable value change 565, which is the change in value of the branching variable candidate from the parent node to the child node (e.g. (1−0.6=0.4). Epsilon (EPS) 555 may be a small value (e.g., 0.1), or may be a range of values. In particular, EPS 555 assists in situations when a MIP mode has no objective function (therefore no objective values) and, in turn, infeasible nodes provide information (fake objective values) to guide branching decisions. Mult is a multiplier 560, which provides a higher weighting to infeasible nodes relative to feasible nodes. Multiplier 560 may also include a range of values. And, pnov is parent node objective value 550, which is the objective value of the parent node.

Once the MIP solver computes fake objective value 530 using the above formula, the MIP solver uses the pseudocost formula above to generate pseudocost 570 using fake objective value 530. In turn, the MIP solver enters pseudocost 570 into one of the respective entries 505.

Figure 6:
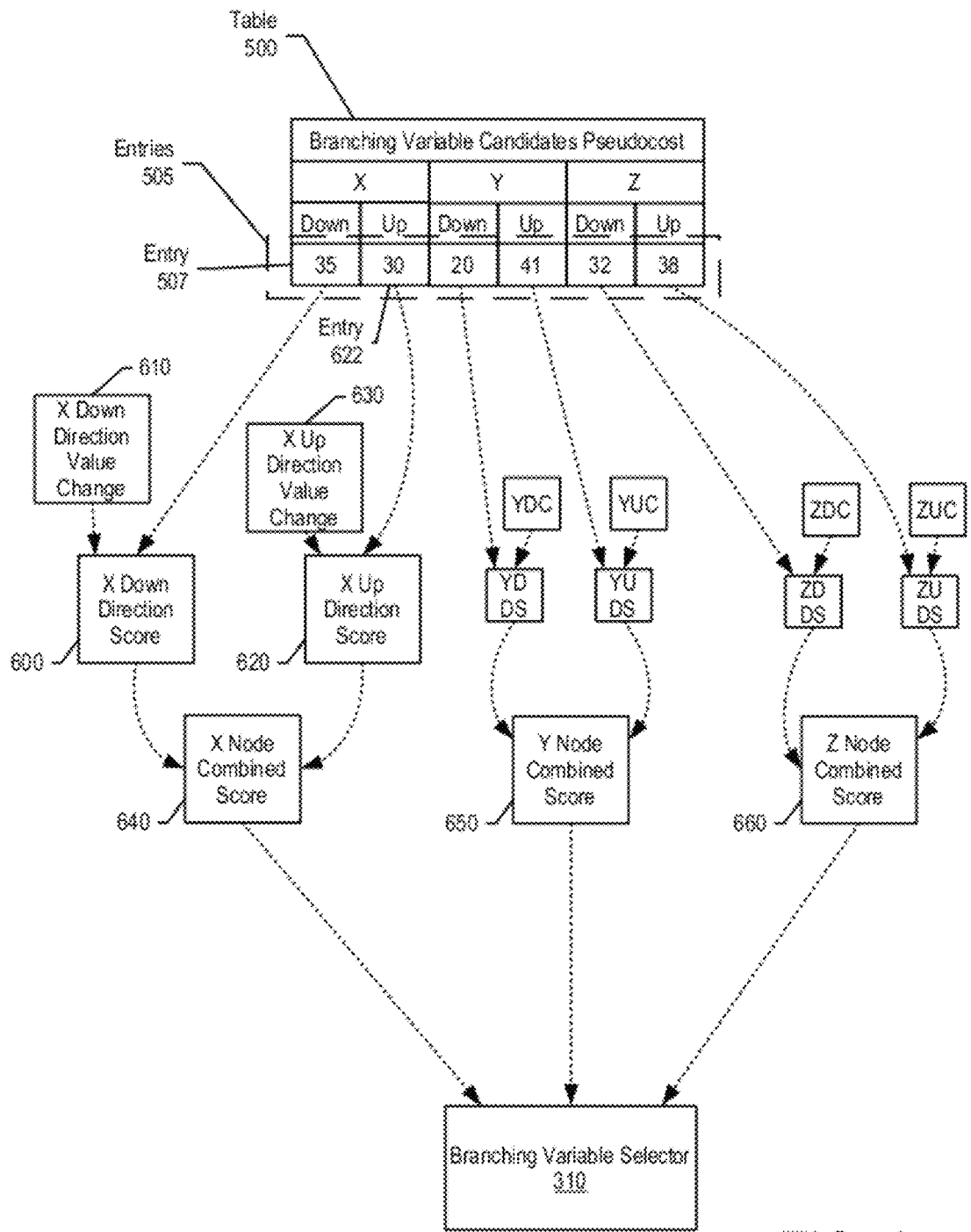
FIG. 6 is a diagram example of computing a branching variable candidate combined score for each branching variable candidate.

FIG. 6 is a diagram example of computing a branching variable candidate combined score for each branching variable candidate. A MIP solver computes combined scores 640-660 and, in one embodiment, branches on the branching variable candidate that has the highest combined score (e.g., X, Y, or Z). The MIP solver uses pseudocost entries 505 included in table 500 to compute such combined scores.

In one embodiment, the MIP solver first computes an upward direction score (X up direction score 620) and a downward direction score (X down direction score 600) for a branching variable candidate using the following formulas:

$$\text{up score}(x) = \text{upward pseudocost}(x) * \text{upward value change}(x)$$

$$\text{down score}(x) = \text{downward pseudocost}(x) * \text{downward value change}(x)$$

In the above formulas, "x" represents a branching variable candidate, "upward pseudocost (x)" represents the retrieved pseudocost of the x branching variable in an upward direction (entry 622), and "upward value change (x)" represents the value change of the x branching variable candidate in an upward direction (X up direction value change 630). Using an example where a parent node includes an x variable value of "0.6" and, in this example, the down x value is "0" and the up x value is "1," branching variable candidate upward value change is "0.4" (1–0.6) and the branching variable candidate downward value change is "0.6" (0.6–0). In this example, if the retrieved upward pseudocost (x) is "30," then up score (x)=30*0.4=12. In turn, the MIP solver computes X down direction score 600 using X down direction value change 610 and entry 507.

The MIP solver then uses X down direction score 600 and X up direction score 620 to compute X node combined score 640 utilizing the following formula, which is similar to adding the two scores together but, as one skilled in the art can appreciate, may include additional computations:

$$\text{combined score}(x) = \text{combination function}(\text{down score}(x), \text{up score}(x))$$

The example shown in FIG. 6 shows that combined scores for branching variable candidates Y and Z are computed in the same manner as discussed above for branching variable candidate X. After the MIP solver computes combined scores 640-660 for branching variable candidates X, Y, and Z, respectively, the MIP solver branches on the branching variable candidate with the highest combined score (branching variable selector 310, see FIGS. 3, 7 (step 735), and corresponding text for further details).

Figure 7:
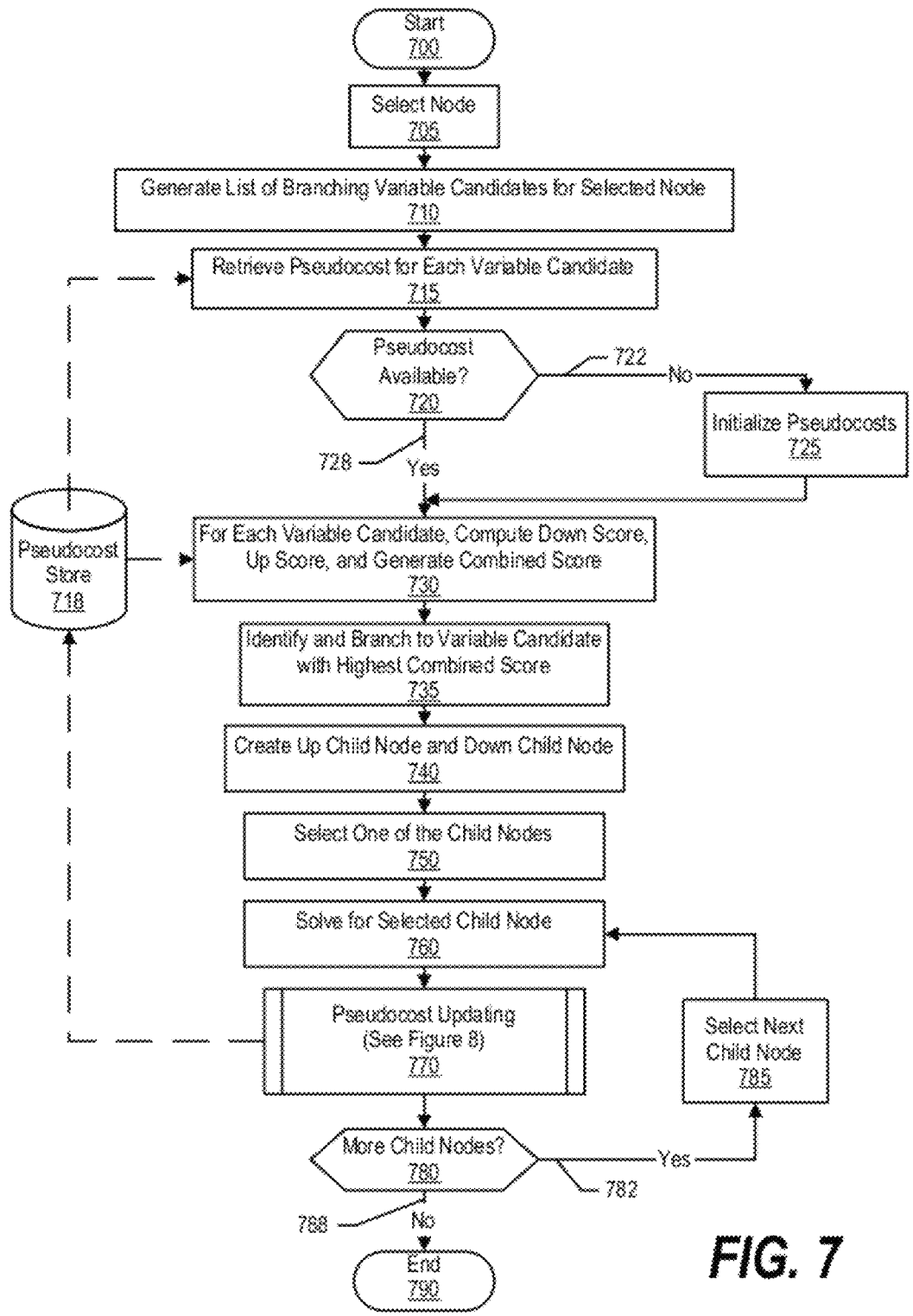
FIG. 7 is an example of a flowchart showing steps taken in selecting a branching variable.

FIG. 7 is an example of a flowchart showing steps taken in selecting a branching variable. Processing commences at 700, whereupon processing selects a node at step 705. For example, a MIP solver may be in the process of identifying solutions for a MIP model, and be at a particular node in a tree that involves a decision as to which branching variable to select.

At step 710, processing generates a list of branching variable candidates for the selected node. Using the example discussed above, processing may identify three branching variable candidates (e.g., X, Y, and Z) for the MIP solver to select one of the three on which to branch (see FIG. 3 and corresponding text for further details). In order to aid in the process of determining which branching variable candidate to select, processing retrieves pseudocosts from pseudocosts store 718 for each variable candidate at step 715. In one embodiment, each branching variable candidate has a corresponding down pseudocost and an up pseudocost (see FIGS. 3, 5-6, and corresponding text for further details). Pseudocosts store 718 may be stored on a volatile or nonvolatile storage area, such as computer memory or a computer hard drive.

A determination is made as to whether pseudocosts are available (decision 720). For example, at the beginning of optimization, pseudocosts may not yet be available because they are based upon prior branching decisions. If pseudocosts are not yet available, decision 720 branches to "No" branch 722 whereupon processing initializes pseudocosts at step 725. On the other hand, if pseudocosts are available, decision 720 branches to "Yes" branch 728.

At step 730, processing uses the retrieved pseudocosts to compute a down score, an up score, and a combined score for each branching variable candidate (see FIG. 6 and corresponding text for further details).

Once processing computes a combined score for each branching variable candidate, processing identifies and branches to a branch that corresponds to the branching variable candidate with the highest combined score (step 735). For example, if the combined scores for branching variable candidates X, Y, and Z are 30, 25, and 20, respectively, processing branches to the "X" node branch since 30 is higher than 25 or 20.

Next, at step 740, processing creates an up child node and a down child node for the selected branch (e.g., x=0 and x=1). Processing selects one of the child nodes (e.g. up child node) at step 750 and, at step 760, processing solves for the selected child node. Processing then updates a corresponding pseudocost based upon the results in step 760 (pre-defined process block 770, see FIG. 8 and corresponding text for further details).

A determination is made as to whether there are more child nodes for which to solve (e.g., down child node) (decision 780). If there are more child nodes, decision 780 branches to "Yes" branch 782, whereupon processing selects the next child node (step 785) and solves for the selected child node. This looping continues until there are no more child nodes to select, at which point decision 780 branches to "No" branch 788 whereupon processing ends at 790.

Figure 8:
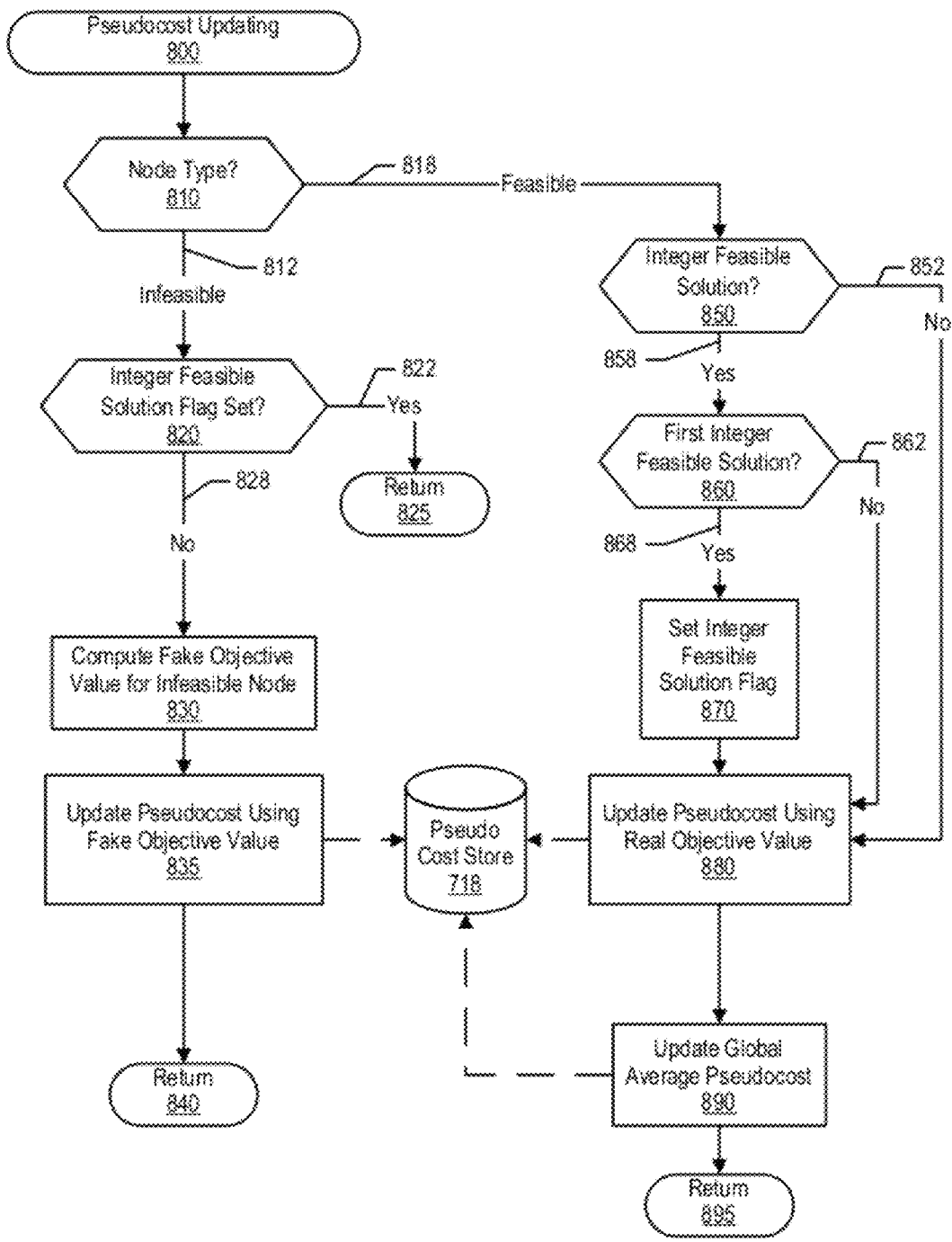
FIG. 8 is an example of a flowchart showing steps taken in updating a branching variable pseudocost using either a fake objective value or a real objective value for a recently solved node.

FIG. 8 is an example of a flowchart showing steps taken in updating a branching variable pseudocost using either a fake objective value or a real objective value for a recently solved node (see FIG. 7 and corresponding text for further details). Processing commences at 800, whereupon a determination is made as to whether the recently solved node is a feasible node or an infeasible node (decision 810). The node is a feasible node when the selected node's variable values result in a feasible solution. Likewise, the node is an infeasible node when the selected node's variable values result in an infeasible solution.

If the node is an infeasible node, decision 810 branches to "No" branch 812, whereupon a determination is made as to whether an integer feasible solution flag is set (decision 820). The integer feasible solution flag indicates that a feasible solution, which is also integer, has been found previously. For example, processing may have previously found a feasible solution where all discrete variables take integer values (see steps 860-870 and discussion below for further details). If the integer feasible solution flag is set, decision 820 branches to "Yes" branch 822 whereupon processing returns at 825, thus not updating the corresponding branching variable candidate's pseudocost, which results in a low weighting of infeasible nodes after a first integer feasible solution is found (see FIG. 3 and corresponding text for further details). In one embodiment, processing may utilize an additional flag to change the relative weighting between infeasible nodes and feasible nodes during optimization, such as when an optimal solution is found (see FIG. 4 and corresponding text for further details).

On the other hand, if processing has not yet found a first integer feasible solution, decision 820 branches to "No" branch 822, whereupon processing computes a fake objective value for the infeasible node at step 830 (see FIG. 5 and corresponding text for further details).

Once processing computes the fake objective value for the infeasible node, processing updates the corresponding branching variable's pseudocost in pseudocost store 718 (step 835). For example, if the child node corresponds to branching variable candidate "X" in an upward direction, then processing updates branching variable candidate X's upward pseudocost entry. In one embodiment, processing computes a weighted average of the most recent value for the pseudocost and the previous pseudocost value. In another embodiment, processing may use the maximum value from both values. Processing returns at 840.

Referring back to decision 810, when the node type is a feasible node (results in a real objective value), decision 810 branches to "No" branch 818. A determination is made as to whether the feasible node solution is integer (decision 850). If the feasible node solution is not integer, decision 850 branches to "No" branch 852, whereupon processing updates the corresponding branching variable candidate's pseudocost in pseudocost store 718 using the feasible solution at step 880 (see FIG. 5 and corresponding text for further details).

On the other hand, if the solution is an integer, decision 858 branches to

"Yes" branch 858 whereupon a determination is made as to whether this is the first occurrence of an integer feasible solution (decision 860). If processing has already found an integer feasible solution, decision 860 branches to "No" branch 862 and updates the corresponding branching variable candidate's pseudocost using the feasible solution (step 880).

On the other hand, if this is the first occurrence of an integer feasible solution, decision 860 branches to "Yes" branch 868, whereupon processing sets a first integer feasible solution flag (step 870) and updates the corresponding branching variable candidate's pseudocost using the feasible solution (step 880). Processing uses the first integer feasible solution flag to identify a point at which to stop computing fake objective values for infeasible nodes (steps 820-830 discussed above).

Processing updates a global average pseudocost in pseudocost store 718 at step 890. The global average pseudocost is the average value of all of the branching variable pseudocosts (x down, x up, y down, y up, etc.), and is used to compute infeasible node fake objective values discussed above (see FIG. 5 and corresponding text for further details). Processing returns at 895.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   identifying, by one or more processors, an infeasible node corresponding to a first branching variable candidate included in a plurality of branching variable candidates, each of the plurality of branching variable candidates corresponding to a same node in a tree data structure;
   computing, by at least one of the one or more processors, a fake objective value of the infeasible node based upon a change in value between the infeasible node and a parent node of the infeasible node;
   selecting, by at least one of the one or more processors, the first branching variable candidate, from the plurality of branching variable candidates, based upon a branching variable pseudocost of the first branching variable candidate that is updated using the fake objective value; and
   branching to a branch corresponding to the selected first branching variable candidate.

2. The method of claim 1 wherein an infeasible node weighting corresponding to the infeasible node varies over time during optimization relative to a feasible node weighting corresponding to a feasible node included in the tree data structure.

3. The method of claim 2 further comprising:
   detecting a first integer feasible solution that includes an integer value; and
   in response to detecting the first integer feasible solution, decreasing the infeasible node weighting below the feasible node weighting.

4. The method of claim 1 further comprising:
   detecting a feasible node that has a real objective value;
   updating the branching variable pseudocost using the real objective value; and
   updating a global average pseudocost using the branching variable pseudocost in response to detecting the feasible node.

5. The method of claim 4 further comprising:
wherein the global average pseudocost is updated only in response to detecting the feasible node; and
wherein the global average pseudocost is unaltered in response to detecting the infeasible node.

6. The method of claim 4 further comprises using the global average pseudocost in the computation of the fake objective value.

7. The method of claim 1 wherein the programming model is a mixed integer programming model.

* * * * *